United States Patent [19]

Bullock

[11] Patent Number: 4,632,288

[45] Date of Patent: Dec. 30, 1986

[54] TIRE CARRIER

[76] Inventor: Roy M. Bullock, 4023 Morse Rd., Columbus, Ohio 43219

[21] Appl. No.: 784,619

[22] Filed: Oct. 4, 1985

[51] Int. Cl.$^4$ ............................................. B62D 43/00
[52] U.S. Cl. .............................. 224/42.12; 224/12.21; 224/42.43; 414/463; 296/37.2
[58] Field of Search ............... 224/42.12, 42.13, 42.21, 224/42.3, 42.43; 414/463; 296/37.2

[56] References Cited

U.S. PATENT DOCUMENTS

| | | | |
|---|---|---|---|
| 2,547,083 | 4/1951 | Lundgren | 414/463 |
| 3,369,683 | 2/1968 | Richards | 224/42.21 X |
| 3,940,041 | 2/1976 | Bott | 224/42.12 |
| 4,029,245 | 6/1977 | Berlin | 224/42.43 |
| 4,230,246 | 10/1980 | Wilson | 224/42.21 |

FOREIGN PATENT DOCUMENTS 13317  6/1907  United Kingdom .............. 224/42.3

Primary Examiner—Stephen Marcus
Assistant Examiner—David Voorhees
Attorney, Agent, or Firm—Mueller and Smith

[57] ABSTRACT

A tire carrier adapted to be mounted in the trunk of a vehicle which carrier has a wheeled carriage assembly which is adapted to mount a spare tire and which is adapted to move between a stored position and an accessible position in the trunk.

15 Claims, 2 Drawing Figures

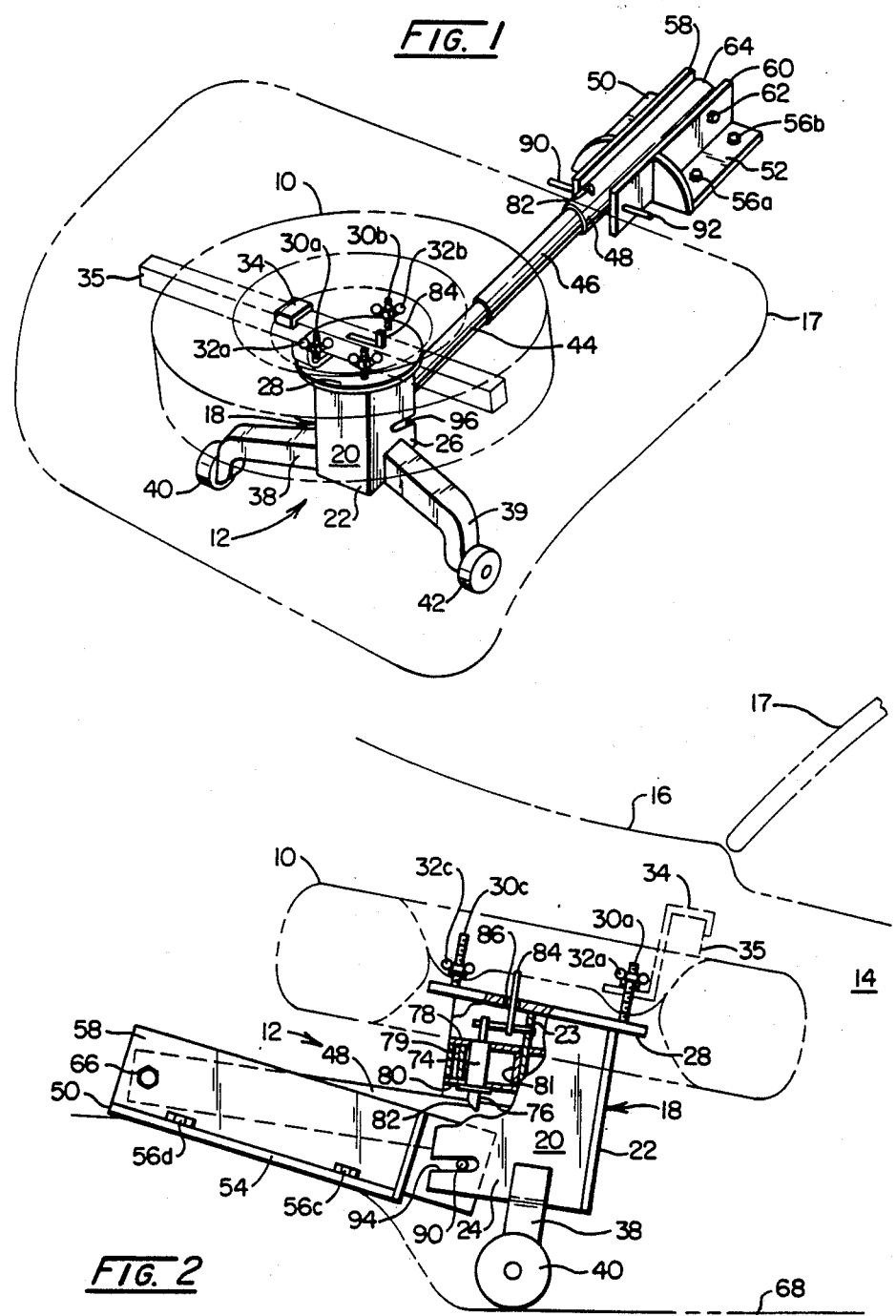

TIRE CARRIER

BACKGROUND OF THE INVENTION

Automobile manufacturers have stored the spare tire and wheel assembly, hereinafter referred to as the spare tire, of an automobile on the floor at the rear of the trunk so that the easily accessible space at the front of the trunk could be used for storage of other items. Because the rear of the trunk may be difficult to reach and/or because a tire is quite cumbersome, it is difficult for many people, particularly older people and women, to move a spare tire from the stored position to the front of the trunk where it can be handled easily from outside the vehicle. Additionally, it is difficult for these people to lift a spare tire from the floor of the trunk and to reposit a spare tire.

A number of devices have been designed to reduce the effort required to move a spare tire from the relatively inaccessible stored position at the rear of a trunk to an accessible position at the front of the trunk and to reduce the effort required to lift a spare tire from the floor of the trunk. Typically, these devices utilize a tray which supports a spare tire and which slides on rails or guides between the front and rear of the trunk. Examples of such devices may be seen in the following citations. U.S. Pat. No. 3,559,829 discloses a spare tire carrier having an elevated tray mounted on parallel guide rails which are supported above the floor of a vehicle trunk. With this device the spare tire can be moved between the front and rear of the trunk and the tire is elevated such that it does not have to be lifted from the floor of the trunk. Because of the heavy cantilevered load on the guide rails which occurs when the tray is at the front of the trunk, the guide rails and the structure which supports the rails must be quite massive and heavy. Additionally, this structure requires a vertical support under the tray which support blocks access to a portion of the trunk beneath the tray. A tire carrier having a tray which is mounted on a plurality of telescoping sections which sections ride on guide rails is shown by Lundgren (U.S. Pat. No. 2,547,083). The telescoping sections have heavy frames to accommodate the cantilevered load which occurs when the spare tire is moved to the front of the trunk. U.S. Pat. No. 2,091,071 disclosed a spare tire carrier having upper and lower trays. An extensive framework is mounted in the trunk of the vehicle to guide rollers mounted on the bottom of the trays. Two additional spare tire carriers which utilize movable trays can be seen in U.S. Pat. No. 2,014,019 and U.S. Pat. No. 2,019,069. The carriers shown in both of these citations require a complex framework to support the movable trays.

One major shortcoming of all of the spare tire carriers shown in the citations is that a relatively complex installation must be accomplished. Additionally, the carriers that have cantilevered trays require relatively heavy frames and support members. These frames and support members occupy significant amounts of trunk space and cannot be removed easily in the event it becomes necessary to use the space occupied by the tire carrier.

It is desirable to provide a carrier for moving a spare tire for an automobile from a stored position at the rear of the trunk to an accessible position at the front of the trunk which can be installed easily, which is lightweight, which lifts the spare tire above the floor of the trunk, which can be removed easily from the trunk and which occupies little trunk space.

SUMMARY OF THE INVENTION

The present invention is addressed to a spare tire carrier which is adaptable to be mounted easily in the trunk of a vehicle, which supports the spare tire above the floor of the trunk, and which moves the spare tire between a stored position at the rear of the trunk and an accessible position at the front of the trunk.

It is an additional feature of the invention to provide a carrier for a spare tire adaptable to be mounted in the trunk of a vehicle which carrier includes a carriage assembly having a support body which is adapted to mount a spare tire and wheel means which is adapted to engage the floor of the trunk. The carrier further includes support means which is adapted to be mounted in the vehicle and telescoping means which is movable towards and away from a retracted position. One end of the telescoping means is attached to the carriage assembly and the other end of the telescoping means is attached to the support means. Also provided are means for restraining vertical movement of the carriage assembly when the telescoping means is in the retracted position and locking means for retaining said telescoping means in said retracted position.

Advantages of the spare tire carrier of the present invention include a carrier which is lightweight and simple in design, which can be installed easily in or can be removed easily from the trunk of a vehicle, and which occupies little trunk space.

Other features of the invention will be obvious and/or will appear hereinafter. The invention, accordingly, comprises the apparatus possessing the construction, combination of elements, and arrangement of parts which are exemplified in the following detailed description. For a fuller understanding of the nature and features of the invention, reference should be had to the following detailed description taken in conjunction with the accompanying drawings.

BRIEF DESCRIPTION OF THE DRAWINGS

FIG. 1 is a perspective view of the tire carrier of the present invention; and

FIG. 2 is a side view of the tire carrier at the stored position in the trunk of an automobile.

DETAILED DESCRIPTION OF THE INVENTION

The instant invention provides a simple and lightweight tire carrier which is adaptable to be mounted in the trunk of a vehicle, which supports a spare tire, and which can move a spare tire easily from a stored position at the rear of the trunk to the front of the trunk where the spare tire can be reached from outside the vehicle. Additionally, the tire carrier supports a spare tire above the floor of the trunk, can be installed easily in the trunk and occupies little trunk space.

It may be seen that spare tire 10 is mounted in a generally horizontal position on top of tire carrier 12 in trunk 14 of a vehicle, shown schematically at 16 (FIG. 2), which has hinged trunk lid 17. In this manner spare tire 10 is elevated above the floor of trunk 14. Carrier 12 includes carriage assembly 18 with upstanding support body 20 having rectangular back wall 22, a rectangular front wall 23, a pair of trapezoidal side walls 24 and 26, and wheel receiving top plate 28. Three threaded studs, 30a, 30b, and 30c, are welded to top plate 28 and extend through bolt holes in the spare tire 10. Wing nuts 32a, 32b, and 32c are threaded onto studs 30a–30c to secure tire 10 to support body 20. One of the wing nuts, 32a, engages clamp 34 which secures jack 35 against the top of spare tire 10. Although clamp 35 is shown locked by wing nut 32a at the rear of plate 28, clamp 35 also could be locked by wing nut 32b at the front of plate 28 which would mount jack 35 further to the rear of trunk 14, e.g. to accommodate different size tires. Carriage assembly 18 further includes a pair of legs 38 and 39 which extend outwardly from opposite side walls 24 and 26, respectively, of the lower portion of support body 20 and which mount wheels 40 and 42 (FIG. 1). Legs 38 and 39 may be formed from a tubular material to conserve weight. Although, two legs 38 and 39 and wheels 40 and 42 are illustrated in the preferred embodiment, carriage assembly 18 could have more than two legs and wheels so that it could support itself in an upright position. Also, a single wide roller could be substituted for wheels 40 and 42. It should be noted that the dimensions of legs 38 and 39, the position of legs 38 and 39 with respect to support body 20, and the number of legs 38 and 39 may be changed to provide optimum mounting of carriage assembly 18 in a vehicle trunk. In some instances, the contour of trunk floor 54 may determine the configuration and number of legs 38 and 39.

Looking to FIG. 1, it may be seen that carriage assembly 18 is maintained in an upright position such that spare wheel 10 is kept in a generally horizontal position by an assemblage of three concentric rigid telescoping rods 44, 46, and 48. Inner rod 44 is attached to support body 20 and outer rod 48 is pivotally connected to a pair of guides 50 and 52 that are anchored to floor 54 of vehicle 16 at the rear of trunk 14 by bolts 56a, 56b, 56c, and 56d. Inner rod 44, preferably, is rigidly attached to support body 20 to maintain body 20 in an upright position. Of course, assembly 18 could be made self-supporting by the addition of a third leg and wheel as mentioned previously, and inner rod 44 could be connected pivotally to support body 20. Guides 50 and 52 have vertical walls 58 and 60 which are spaced apart a distance slightly greater than the outside diameter of outer rod 48. Rod 48 extends between walls 58 and 60 and is attached pivotally to the back end of walls 58 and 60 by bolt 62 that passes successively through a hole in wall 60, holes in the back end 64 of rod 48, and a hole in wall 58 and engages nut 66. In this manner, rod 48 is attached pivotally with respect to the body of vehicle 16 such that it and telescoping rods 44 and 46 can move in a vertical plane about the axis of bolt 62, but are prevented from moving in a horizontal plane, i.e., sideways, by walls 58 and 60. Since telescoping rods 44–48 cannot move sideways, carriage assembly 18 also cannot move sideways because it is attached rigidly to inner rod 44. The pivotal mounting of rod 48 accommodates vertical movement of telescoping rods 44, 46, and 48 which occurs when carriage assembly 18 traverses trunk floor 68 between the rear and the front of trunk 14. Such pivotal arrangement also accommodates any vertical movement of the carriage assembly 18 which may occur.

When spare tire 10 is not needed, carriage assembly 18 is stored at the rear of trunk 14. When assembly 18 is in this position, telescoping rods 44, 46, and 48 are retracted as shown in FIG. 2 and assembly 18 is locked to prevent rods 44–48 from extending. Looking to FIG. 2, latch housing 74 having downwardly extending spring biased bolt 76 is mounted in support body 20 between a pair of horizontally disposed plates 78 and 80 which extend laterally between side walls 24 and 26 and below top plate 28 and between a pair of vertically disposed plates 78 and 81 which extend laterally between side walls 24 and 26 and engage plates 78 and 80. Plate 81 abuts front wall 23 of support body 20. Bolt 76 is biased to project into opening 82 in outer rod 48. This arrangement locks carriage assembly 18 to rod 48 and thereby prevents rods 44–48 from being extended. Actuating arm 84 extends upwardly from latch housing 74 through hole 86 in top plate 28 of support body 20 and thence through the center hole of spare tire 10. When arm 84 is rotated, bolt 76 is withdrawn from opening 82 and retracts into latch housing 74, in the same manner as a bolt retracts when a conventional door knob is rotated. This permits rods 44–48 to extend and carriage assembly 18 to move horizontally towards the front of trunk 14. In the stored position as depicted in FIG. 2, carriage assembly 18 also is restrained against vertical movement by a pair of lateral pins 90 and 92 (FIG. 1) which project from walls 58 and 60 of guides 50 and 52 and which pins are received into slots 94 (FIG. 2) and 96 (FIG. 1) in side walls 24 and 26 of support body 20.

In order to move spare tire 10 from the stored position at the rear of trunk 14 depicted in FIG. 2 to the front of the trunk as depicted in FIG. 1, it is necessary merely to rotate arm 84 to retract bolt 76 (FIG. 2) and pull carriage assembly 18 or spare tire 10 towards the front of vehicle 16. Wheels 40 and 42 roll on floor 68 and permit carriage assembly 18 to be pulled to the front of trunk 14 with relatively little force. Once spare tire 10 is at the front of trunk 14, it can be detached from support body 20 by removing wing nuts 32a, 32b, and 32c, from their respective studs 30a, 30b, and 30c. In order to reposit spare tire 10, it is re-mounted on top plate 28 of support body 20 and secured by wing nuts 32a–32c. Thereafter, spare tire 10 and carriage assembly 18 are pushed towards the rear of trunk 14. When assembly 18 reaches the stored position, pins 90 and 92 enter into slots 94 and 96 in support body 20 and bolt 76 enters opening 82 in outer rod 48 to lock assembly 18 in position.

It should be noted that the only installation required for tire carrier 12 consists of anchoring guides 50 and 52 in the floor of vehicle 16 with bolts 56a–56d. Consequently, carrier 12 can be removed easily from trunk 14 by removing bolts 56a–56d if the space occupied by carrier 12 is needed. Carriage assembly 18 and telescoping rods 44–48 alone can be removed from trunk 14 merely by removing bolt 62 from guides 58 and 60 and outer rod 48.

Because carriage assembly 18 is located beneath spare tire 10, carrier 12 occupies very little trunk space. Also, because spare tire 10 can be centered on support body 20, carriage assembly 18 is quite stable. Further advantages of the simple, straightforward design of tire carrier 12 include that carrier 12 does not require a complex frame or massive support members and that carriage assembly 18 and telescoping rods 44–48 together weigh only 27 pounds, when constructed from steel. Of course, the components of tire carrier 12 could be constructed from plastic or fiberglass to reduce the weight of the assembly. Thus, it may be seen that the instant invention provides wheel carrier 12 which is simple, which can be operated with little effort, which occupies little trunk space, which is relatively lightweight, which elevates the spare tire above the floor of the trunk, and which can be installed easily in a trunk.

Since certain changes may be made to the above-described apparatus without departing from the scope of the invention herein, it is intended that all matter contained in the description thereof or shown in the accompanying drawings shall be interpreted as illustrative and not in a limiting sense.

I claim:

1. A carrier for a spare tire adaptable to be mounted in the trunk of a vehicle, which comprises:
   a carriage assembly having a support body which is adapted to mount a spare tire;
   wheel means on said carriage assembly which wheel means is adapted to engage the floor of said trunk;
   support means which is adapted to be mounted in said vehicle;
   telescoping means having one end attached to said support means and the other end attached to said carriage means, wherein said telescoping means is movable towards and away from a retracted position, and said carriage assembly is stored when said telescoping means is in said retracted position;
   means for restraining vertical movement of said carriage assembly when said telescoping means is in said retracted position; and
   locking means for retaining said carriage assembly in said stored position.

2. The carrier of claim 1 in which said support body includes a receiving plate for said spare tire.

3. The carrier of claim 2 in which:
   a plurality of threaded studs project from said receiving plate;
   said studs are adapted to pass through bolt holes in said spare tire; and
   nuts are threaded on said studs to retain said spare tire on said support body.

4. The carrier of claim 1 in which said telescoping means is pivotally attached to said support means to permit vertical movement of said telescoping means when said carriage assembly traverses the floor of said trunk.

5. The carrier of claim 1 in which said telescoping means includes a plurality of concentric tubes.

6. The carrier of claim 5 in which one of said tubes is pivotally attached to said support means and another of said tubes is rigidly attached to said carriage assembly.

7. The carrier of claim 1 in which said support means includes guide means for preventing sideways movement of said telescoping means.

8. The carrier of claim 1 in which said restraining means includes a pin on one of said support means or said carriage assembly which engages a slot in the other of said support means or said carriage assembly.

9. The carrier of claim 1 in which said locking means includes a latch on said support body having a bolt which projects into an opening in said telescoping means.

10. The carrier of claim 9 in which:
    said latch includes actuating means for withdrawing said bolt; and
    said actuating means projects outwardly through the center opening of said spare tire.

11. The carrier of claim 1 in which a spare tire substantially overlies said carriage assembly.

12. A carrier for a spare tire adaptable to be mounted in the trunk of a vehicle, which comprises:
    a carriage assembly having a support body which is adapted to mount a spare tire;
    a pair of wheels attached to said support body which are adapted to engage the floor of the trunk;
    support means which is adaptable to be mounted in said vehicle;
    telescoping means having one end attached to said support means and the other end attached to said support body, wherein said telescoping means is movable towards and away from a retracted position, and said carriage assembly is stored when said telescoping means is in said retracted position;
    means for restraining vertical movement of said carriage assembly when said telescoping means is in said retracted position, wherein said restraining means includes a pin on said support means which engages a slot in said support body; and
    locking means for retaining said carriage assembly in said stored position, wherein said locking means includes a latch on said support body having a bolt which projects into an opening in said telescoping means.

13. The carrier of claim 12 in which said support means includes guide means for preventing sideways movement of said telescoping means.

14. The carrier of claim 12 in which:
    said support body includes a receiving plate for said spare tire;
    a plurality of threaded studs project from said receiving plate; and
    said studs are adapted to pass through bolt holes in said spare tire.

15. The carrier of claim 12 in which:
    said latch includes actuating means for withdrawing said bolt; and
    said actuating means projects outwardly through the center opening of said spare tire.

* * * * *